(12) United States Patent
Xie et al.

(10) Patent No.: US 11,415,067 B2
(45) Date of Patent: Aug. 16, 2022

(54) CONTROL SYSTEM AND METHOD FOR MULTI-FUEL GENERATOR ENGINE

(71) Applicant: Zhejiang Yaofeng Power Technology Co., Ltd., Shaoxing (CN)

(72) Inventors: Rutang Xie, Shaoxing (CN); Xiang Chen, Shaoxing (CN); Jianxiong Zhu, Shaoxing (CN); Bin Sun, Shaoxing (CN)

(73) Assignee: ZHEJIANG YAOFENG POWER TECHNOLOGY CO., LTD., Shaoxing (CN)

( * ) Notice: Subject to any disclaimer, the term of this patent is extended or adjusted under 35 U.S.C. 154(b) by 0 days.

(21) Appl. No.: 17/105,123

(22) Filed: Nov. 25, 2020

(65) Prior Publication Data

US 2022/0074357 A1 Mar. 10, 2022

(30) Foreign Application Priority Data

Sep. 8, 2020 (CN) .......................... 202010931890.3
Oct. 30, 2020 (CN) .......................... 202011184879.1

(51) Int. Cl.
| | |
|---|---|
| *F02D 19/06* | (2006.01) |
| *F02B 63/04* | (2006.01) |
| *F02P 11/02* | (2006.01) |
| *F02N 11/08* | (2006.01) |

(52) U.S. Cl.
CPC ........ *F02D 19/0623* (2013.01); *F02B 63/042* (2013.01); *F02D 19/0613* (2013.01); *F02D 19/0681* (2013.01); *F02N 11/0862* (2013.01); *F02P 11/02* (2013.01); *F02D 19/0665* (2013.01)

(58) Field of Classification Search
CPC ............. F02D 19/0623; F02D 19/0613; F02D 19/0681; F02D 19/0665; F02B 63/042; F02N 11/0862; F02P 11/02
USPC .................................................. 123/510, 525
See application file for complete search history.

(56) References Cited

U.S. PATENT DOCUMENTS

| | | | | |
|---|---|---|---|---|
| 6,009,860 A | * | 1/2000 | Brown ................... | F02D 19/024 |
| | | | | 123/529 |
| 2006/0181399 A1 | * | 8/2006 | Sumiya ................... | B60K 37/02 |
| | | | | 340/461 |
| 2018/0080392 A1 | * | 3/2018 | Janscha ................... | F02B 69/04 |

* cited by examiner

*Primary Examiner* — Mahmoud Gimie
(74) *Attorney, Agent, or Firm* — Muncy, Geissler, Olds & Lowe, P.C.

(57) ABSTRACT

A control system and method for a multi-fuel generator engine are mainly applied to multi-fuel generator products. The control system comprises a controller, a first signal input terminal, a second signal input terminal, a third signal input terminal, and an output terminal connected to an ignition device of a generator engine. When the third signal input terminal of the controller receives a generator engine start signal and either the first signal input terminal or the second signal input terminal receives a signal corresponding to an on state of the corresponding valve assembly, the controller controls the ignition device to ignite. According to control system and method, the controller detects signals corresponding to the states of the two fuel valve assemblies to determine whether or not fuels are normally supplied, so that operating instabilities or faults caused by synchronous supply of two fuels to the generator engine are avoided.

13 Claims, 7 Drawing Sheets

CONTROL SYSTEM AND METHOD FOR MULTI-FUEL GENERATOR ENGINE

BACKGROUND OF THE INVENTION

1. Technical Field

The invention relates to a control system and method for a multi-fuel generator engine. The control system and method are typically applied to multi-fuel generator products to ensure that only one fuel is used by generators within the same time period.

2. Description of Related Art

The generator involved in the invention specifically refers to a mechanical device that is driven by a non-road spark-ignition engine to convert chemical energy generated by fuel combustion into mechanical energy which is then transmitted to the generator to be converted into electric energy by the generator.

To adapt to different application scenarios, dual-fuel generators, which can select one fuel (such as gasoline, liquefied petroleum gas or natural gas) for use according to requirements or current environments, have been brought into being on the market. Because such dual-fuel generators have two different fuel delivery pipes, it is necessary to control on-off the two fuel delivery pipes through different valves separately. In actual application, both fuel delivery pipes may be turned on due to misoperation of an operator, and in this case, two different fuels will be mixed, thus resulting in potential safety risks.

BRIEF SUMMARY OF THE INVENTION

The objective of the invention is to overcome the defects of the prior art by providing a control system and method for a multi-fuel generator engine.

The objective of the invention is fulfilled through the following technical solution:

An engine control system for a multi-fuel generator comprises:

A first fuel valve assembly which has an on state and an off state and is disposed on a first fuel delivery pipe to control the supply of a first fuel;

A second fuel valve assembly which has an on state and an off state and is disposed on the second fuel delivery pipe to control the supply of a second fuel;

The control system further comprises:

A controller which has a first signal input terminal connected to the first fuel valve assembly to acquire a signal corresponding to a current state of the first fuel valve assembly, a second signal input terminal connected to the second fuel valve assembly to acquire a signal corresponding to a current state of the second fuel valve assembly, a third signal input terminal for receiving a generator engine start and/or stop signal, and an output terminal connected to an ignition device of a generator engine;

A power supply unit for supplying power to the controller, wherein:

When the third signal input terminal of the controller receives the generator engine start signal and either the first signal input terminal or the second signal input terminal receives a signal corresponding to the on state of the corresponding valve assembly, the controller controls the ignition device to ignite. That is, when the third signal input terminal of the controller receives the generator engine start signal, the first signal input terminal receives a signal corresponding to the on state of the first fuel valve assembly and the second signal input terminal receives a signal corresponding to the off state of the second fuel valve assembly, the controller controls the ignition device to ignite; or, when the third signal input terminal of the controller receives the generator engine start signal and the first signal input terminal receives a signal corresponding to the off state of the first fuel valve assembly and the second signal input terminal receives a signal corresponding to the on state of the second fuel valve assembly, the controller controls the ignition device to ignite.

Preferably, the first fuel valve assembly comprises a first fuel valve disposed on the first fuel delivery pipe and a first switch adjacent to the first fuel valve, a first trigger part matched with the first switch is disposed on the first fuel valve and triggers the first switch in the on state or in the off state, and the first switch has a terminal connected to the first signal input terminal and a terminal grounded or connected to a high level. When the first fuel valve is turned on or off, the first trigger part triggers the first switch (such as a micro-switch), and a low-level (ground) or high-level signal is acquired by the first signal input terminal to serve as the signal corresponding to the on state or off state of the first fuel valve assembly.

Preferably, the second fuel valve assembly comprises a second fuel valve disposed on the second fuel delivery pipe and a second switch adjacent to the second fuel valve, a second trigger part matched with the second switch is disposed on the second fuel valve and triggers the second switch in the on state or in the off state, and the second switch has a terminal connected to the second signal input terminal and a terminal grounded or connected to a high level. When the second fuel valve is turned on or off, the second trigger part triggers the second switch (such as a micro-switch), a low-level (ground) or high-level signal is acquired by the second signal input terminal to serve as the signal corresponding to the on state or off state of the second fuel valve assembly.

Preferably, a switch valve (such as an electromagnetic valve) is disposed on the first fuel delivery pipe and/or the second fuel delivery pipe, and a control signal input terminal of the switch valve is communicated and connected with the controller. The controller can control the switch valve to open or close to prevent residual fuels in the delivery pipes from passively entering the generator engine.

Preferably, the control system further comprises an indicator device connected to the controller, and the indicator device is used to indicate a current operating state of the generator engine to a user.

A control method for a multi-fuel generator engine comprises:

Providing a first fuel valve assembly which has an on state and an off state and is used to control the supply of a first fuel;

Providing a second fuel valve assembly which has an on state and an off state and is used to control the supply of a second fuel;

Providing a controller which has a first signal input terminal connected to the first fuel valve assembly to acquire a signal corresponding to a current state of the first fuel valve assembly, a second signal input terminal connected to the second fuel valve assembly to acquire a signal corresponding to a current state of the second fuel valve assembly, a third signal input terminal for receiving a generator engine start and/or stop signal, and an output terminal connected to an ignition device of the generator engine; and Providing a power supply unit for supplying power to the controller, wherein:

When the third signal input terminal of the controller receives the generator engine start signal and either the first signal input terminal or the second signal input terminal receives a signal corresponding to the on state of the corresponding valve assembly, the controller controls the ignition device to ignite. That is, when the third signal input terminal of the controller receives the generator engine start signal, the first signal input terminal receives a signal corresponding to the on state of the first fuel valve assembly and the second signal input terminal receives a signal corresponding to the off state of the second fuel valve assembly, the controller controls the ignition device to ignite; or, when the third signal input terminal of the controller receives the generator engine start signal, the first signal input terminal receives a signal corresponding to the off state of the first fuel valve assembly and the second signal input terminal receives a signal corresponding to the on state of the second fuel valve assembly, the controller controls the ignition device to ignite.

Preferably, the first fuel valve assembly comprises a first fuel valve disposed on the first fuel delivery pipe and a first switch adjacent to the first fuel valve, a first trigger part matched with the first switch is disposed on the first fuel valve and triggers the first switch in the on state or in the off state, and the first switch has a terminal connected to the first signal input terminal and a terminal grounded or connected to a high level. When the first fuel valve is turned on or off, the first trigger part triggers the first switch (such as a micro-switch), and a low-level (ground) or high-level signal is acquired by the first signal input terminal to serve as the signal corresponding to the on state or off state of the first fuel valve assembly.

Preferably, the second fuel valve assembly comprises a second fuel valve disposed on a second fuel delivery pipe and a second switch adjacent to the second fuel valve, a second trigger part matched with the second switch is disposed on the second fuel valve and triggers the second switch in the on state or in the off state, and the second switch has a terminal connected to the second signal input terminal and a terminal grounded or connected to a high level. When the second fuel valve is turned on or off, the second trigger part triggers the second switch (such as a micro-switch), a low-level (ground) or high-level signal is acquired by the second signal input terminal to serve as the signal corresponding to the on state or off state of the second fuel valve assembly.

Preferably, a switch valve (such as an electromagnetic valve) is disposed on the first fuel delivery pipe and/or the second fuel delivery pipe, and a control signal input terminal of the switch valve is communicated and connected with the controller. The controller can control the switch valve to open or close to prevent residual fuels in the pipes from passively entering the generator engine.

Preferably, the control system further comprises an indicator device connected to the controller, and the indicator device is used to indicate a current operating state of the generator engine to a user.

A control system for a multi-fuel generator engine comprises:

A first fuel valve assembly which has an on state and an off state and is disposed on a first fuel delivery pipe to control the supply of a first fuel;

A second fuel valve assembly which has an on state and an off state and is disposed on the second fuel delivery pipe to control the supply of a second fuel;

The control system further comprises:

A controller which has a first signal input terminal connected to the first fuel valve assembly to acquire a signal corresponding to a current state of the first fuel valve assembly, a second signal input terminal connected to the second fuel valve assembly to acquire a signal corresponding to a current state of the second fuel valve assembly, and an output terminal connected to an ignition device of a generator engine; and A power supply unit which acquires power, after the generator engine is started, from the generator engine or a generator and supplies the power to the controller, wherein:

When either the first signal input terminal or the second signal input terminal of the controller receives a signal corresponding to the on state of the corresponding valve assembly, a current operating state is maintained. That is, after the generator engine is started, when the first signal input terminal of the controller receives a signal corresponding to the on state of the first fuel valve assembly and the second signal input terminal receives a signal corresponding to the off state of the second fuel valve assembly, the current normal operating state of the generator engine is maintained;

Or, when the first signal input terminal of the controller receives a signal corresponding to the off state of the first fuel valve assembly and the second signal input terminal of the controller receives a signal corresponding to the on state of the second fuel valve assembly, the current normal operating state of the generator engine is maintained.

Preferably, when the first signal input terminal and the second signal input terminal of the controller receive signals corresponding to the on state of the valve assembles in the same period of time, that is, both fuels can be supplied, the controller controls the ignition device to flame out the engine:

Or, when the first signal input terminal and the second signal input terminal of the controller receive signals corresponding to the off state of the valve assemblies in the same period of time, that is, neither of the two fuels can be supplied, the controller controls the ignition device to flame out the engine.

Preferably, the first fuel valve assembly comprises a first fuel valve disposed on the first fuel delivery pipe and a first switch adjacent to the first fuel valve, a first trigger part matched with the first switch is disposed on the first fuel valve and triggers the first switch in the on state or in the off state, and the first switch has a terminal connected to the first signal input terminal and a terminal grounded or connected to a high level. When the first fuel valve is turned on or off, the first trigger part triggers the first switch (such as a micro-switch), and a low-level (ground) or high-level signal is acquired by the first signal input terminal to serve as the signal corresponding to the on state or off state of the first fuel valve assembly.

Preferably, the second fuel valve assembly comprises a second fuel valve disposed on the second fuel delivery pipe and a second switch adjacent to the second fuel valve, a second trigger part matched with the second switch is disposed on the second fuel valve and triggers the second switch in the on state or in the off state, and the second switch has a terminal connected to the second signal input terminal and a terminal grounded or connected to a high level. When the second fuel valve is turned on or off, the second trigger part triggers the second switch (such as a micro-switch), a low-level (ground) or high-level signal is acquired by the second signal input terminal to serve as the signal corresponding to the on state or off state of the second fuel valve assembly.

Preferably, the power supply unit comprises:

A coil for generating alternating currents when the generator engine operates, wherein if the coil is a charging coil of the engine, alternating currents will be generated when the generator engine operates; or, if the coil is a generator winding, the generator engine operates and drives a generator to operate to generate alternating currents; and A rectification circuit which has an input terminal connected to the coil and an output terminal connected to the controller and is used to rectify the alternating currents generated by the coil into direct currents to be supplied to the controller.

Preferably, a switch valve (such as an electromagnetic valve) is disposed on the first fuel delivery pipe and/or the second fuel delivery pipe, and a control signal input terminal of the switch valve is communicated and connected with the controller. The controller can control the switch valve to open or close to prevent residual fuels in the pipes from passively entering the generator engine.

Preferably, the control system further comprises an indicator device connected to the controller, and the indicator device is used to indicate a current operating state of the generator engine to a user.

Preferably, the controller further has a third signal input terminal for receiving a generator engine stop signal to allow a user to shut down the generator engine.

A control method for a multi-fuel generator engine comprises:

Providing a first fuel valve assembly which has an on state and an off state and is used to control the supply of a first fuel;

Providing a second fuel valve assembly which has an on state and an off state and is used to control the supply of a second fuel;

Providing a controller which has a first signal input terminal connected to the first fuel valve assembly to acquire a signal corresponding to a current state of the first fuel valve assembly, a second signal input terminal connected to the second fuel valve assembly to acquire a signal corresponding to a current state of the second fuel valve assembly, and an output terminal connected to an ignition device of a generator engine:

Providing a power supply unit which acquires power, after the generator engine is started, from the generator engine or a generator and supplies the power to the controller, wherein:

When either the first signal input terminal or the second signal input terminal of the controller receives a signal corresponding to the on state of the corresponding valve assembly, a current operating state is maintained. That is, after the generator engine is started, when the first signal input terminal of the controller receives a signal corresponding to the on state of the first fuel valve assembly and the second signal input terminal receives a signal corresponding to the off state of the second fuel valve assembly, the current normal operating state of the generator engine is maintained; or, when the first signal input terminal of the controller receives a signal corresponding to the off state of the first fuel valve assembly and the second signal input terminal of the controller receives a signal corresponding to the on state of the second fuel valve assembly, the current normal operating state of the generator engine is maintained.

Preferably, when the first signal input terminal and the second signal input terminal of the controller receive signals corresponding to the on state of the valve assembles in the same period of time, that is, both fuels can be supplied, the controller controls the ignition device to flame out the engine;

Or, when the first signal input terminal and the second signal input terminal of the controller receive signals corresponding to the off state of the valve assemblies in the same period of time, that is, neither of the two fuels can be supplied, the controller controls the ignition device to flame out the engine.

Preferably, the first fuel valve assembly comprises a first fuel valve disposed on the first fuel delivery pipe and a first switch adjacent to the first fuel valve, a first trigger part matched with the first switch is disposed on the first fuel valve and triggers the first switch in the on state or in the off state, and the first switch has a terminal connected to the first signal input terminal and a terminal grounded or connected to a high level. When the first fuel valve is turned on or off, the first trigger part triggers the first switch (such as a micro-switch), and a low-level (ground) or high-level signal is acquired by the first signal input terminal to serve as the signal corresponding to the on state or off state of the first fuel valve assembly.

Preferably, the second fuel valve assembly comprises a second fuel valve disposed on a second fuel delivery pipe and a second switch adjacent to the second fuel valve, a second trigger part matched with the second switch is disposed on the second fuel valve and triggers the second switch in the on state or in the off state, and the second switch has a terminal connected to the second signal input terminal and a terminal grounded or connected to a high level. When the second fuel valve is turned on or off, the second trigger part triggers the second switch (such as a micro-switch), a low-level (ground) or high-level signal is acquired by the second signal input terminal to serve as the signal corresponding to the on state or off state of the second fuel valve assembly.

Preferably, the power supply unit comprises:

A coil for generating alternating currents when the generator engine operates, wherein if the coil is a charging coil of the engine, alternating currents will be generated when the generator engine operates; or, if the coil is a generator winding, the generator engine operates and drives a generator to operate to generate alternating currents; and A rectification circuit which has an input terminal connected to the coil and an output terminal connected to the controller and is used to rectify the alternating currents generated by the coil into direct currents to be supplied to the controller.

Preferably, a switch valve (such as an electromagnetic valve) is disposed on the first fuel delivery pipe and/or the second fuel delivery pipe, and a control signal input terminal of the switch valve is communicated and connected with the controller. The controller can control the switch valve to open or close to prevent residual fuels in the pipes from passively entering the generator engine.

Preferably, the control system further comprises an indicator device connected to the controller, and the indicator device is used to indicate a current operating state of the generator engine to a user.

Preferably, the controller further has a third signal input terminal for receiving a generator engine stop signal to allow a user to shut down the generator engine.

The invention has the following beneficial effects:

1. The controller detects signals corresponding to the states of the two fuel valve assemblies to determine whether or not fuels are normally supplied, so that operating instabilities or faults caused by synchronous supply of two fuels to the generator engine are avoided.

2. When the first signal input terminal and the second signal input terminal of the controller receive the signals corresponding to the on state of the valve assemblies in the same period of time, that is, both fuels can be supplied, or when the first signal input terminal and the second signal input terminal receive the signals corresponding to the off state of the valve assemblies in the same period of time, that is, neither of the two fuels can be supplied, the controller controls the ignition device to flame out the engine, so that abnormal fuel supply can be intelligently determined, and the generator engine can be shut down in time to be protected.

3. The indicator device is configured to remind users of a normal condition when the fuels are supplied normally (only one fuel supply pipe is connected to the generator engine) and to remind the users of an abnormal condition to shut down the generator engine in time when the fuels are supplied abnormally (both fuels can be supplied or neither of the two fuels can be supplied); when the users fail to shut down the generator engine in time, the generator engine will be stopped automatically when it reaches the maximum abnormal operating time permitted by the controller.

4. The fuel valve assemblies are simple in structure and ingenious in design, and motions of the valve assemblies can be timely converted into correspondingly signals to be acquired by the controller to determine whether or not fuels are supplied normally.

5. The switch valve is disposed on the fuel delivery pipe(s), so that multi-protection of the fuel supply system is realized.

DETAILED DESCRIPTION OF THE INVENTION

The invention is further described below in conjunction with embodiments. The description of the following embodiments is merely for a better understanding of the invention. It should be noted that various improvements and modifications can be made to the invention by those ordinarily skilled in the art without departing from the principle of the invention, and all these improvements and modifications should also fall within the protection scope defined by the claims of the invention.

Embodiment 1

Figure 1:
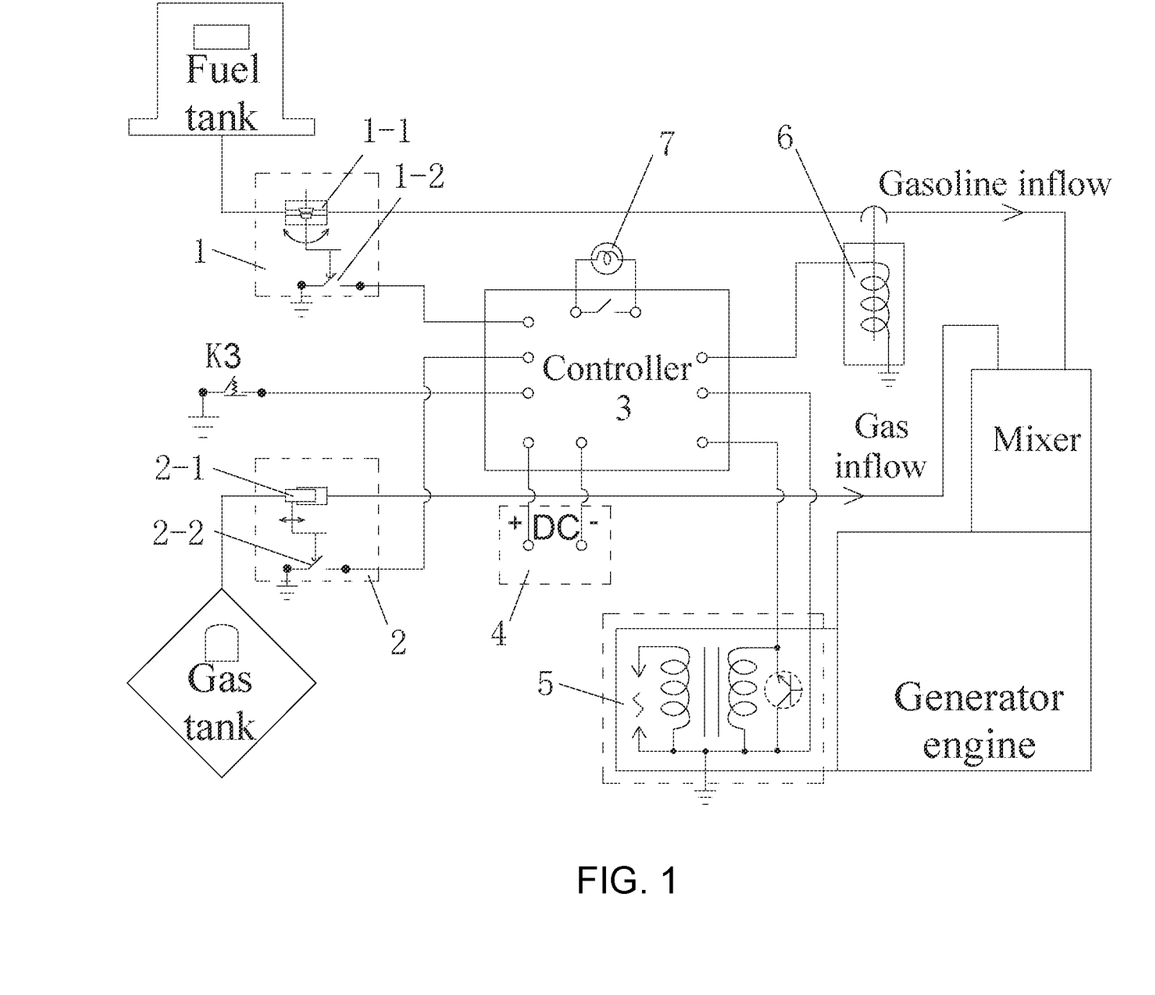
FIG. 1 is a structural diagram of Embodiment 1 (TCI).

As shown in FIG. 1, this embodiment provides a control system for a dual-fuel generator engine, comprising:

A first fuel valve assembly 1 which has an on state and an off state and is disposed on a first fuel delivery pipe to control the supply of a first fuel;

A second fuel valve assembly 2 which has an on state and an off state and is disposed on a second fuel delivery pipe to control the supply of a second fuel;

A controller 3 which has a first signal input terminal connected to the first fuel valve assembly 1 to acquire a signal corresponding to a current state of the first fuel valve assembly, a second signal input terminal connected to the second fuel valve assembly 2 to acquire a signal corresponding to a current state of the second fuel valve assembly, a third signal input terminal for receiving a generator engine start and/or stop signal, and an output terminal connected to an ignition device 5 of a generator engine;

A power supply unit 4 which supplies power to the controller 3 through an internal battery or an external accumulator, wherein in this embodiment, the power supply unit 4 supplies power to the controller 3 through the external accumulator, that is, the controller 3 is in an electrical state and can work normally before the generator engine is started:

When the third signal input terminal of the controller 3 receives the generator engine start signal and either the first signal input terminal or the second signal input terminal receives a signal corresponding to the on state of the corresponding valve assembly, the controller 3 controls the ignition device 5 to ignite. That is, when the third signal input terminal of the controller 3 receives the generator engine start signal (by means of a remote key, a mobile phone APP or an external switch, in this embodiment, an external switch K3 is directly connected to the third signal input terminal, and the other terminal of the switch is grounded), the first signal input terminal receives a signal corresponding to the on state of the first fuel valve assembly 1 and the second signal input terminal receives a signal corresponding to the off state of the second fuel valve assembly 2, the controller 3 controls the ignition device 5 to ignite; or when the third signal input terminal of the controller 3 receives the generator engine start signal, the first signal input terminal receives a signal corresponding to the off state of the first fuel valve assembly 1 and the second signal input terminal receives a signal corresponding to the on state of the second fuel valve assembly 2, the controller 3 controls the ignition device 5 to ignite.

Figure 2:
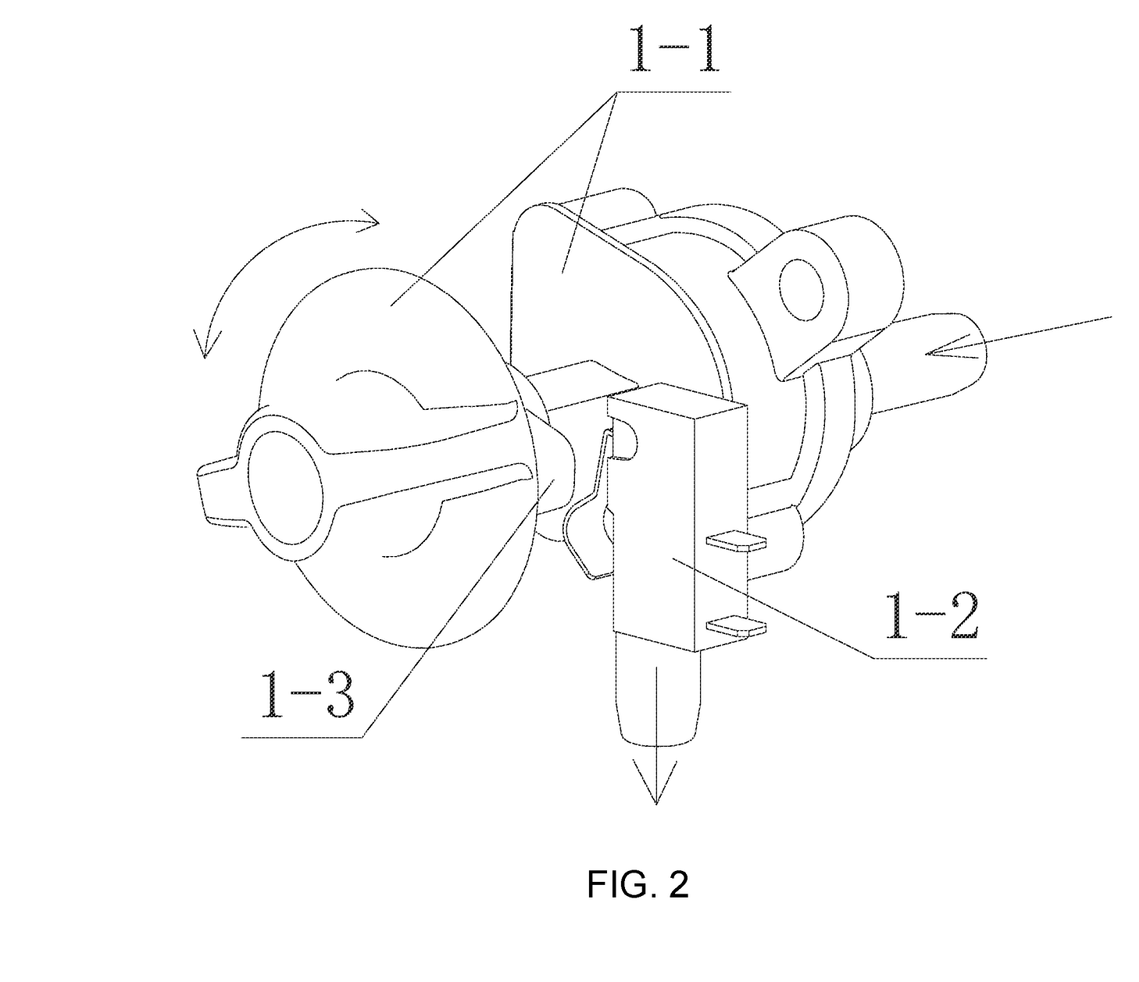
FIG. 2 is a structural diagram of a first fuel valve assembly of the invention.
Figure 3:
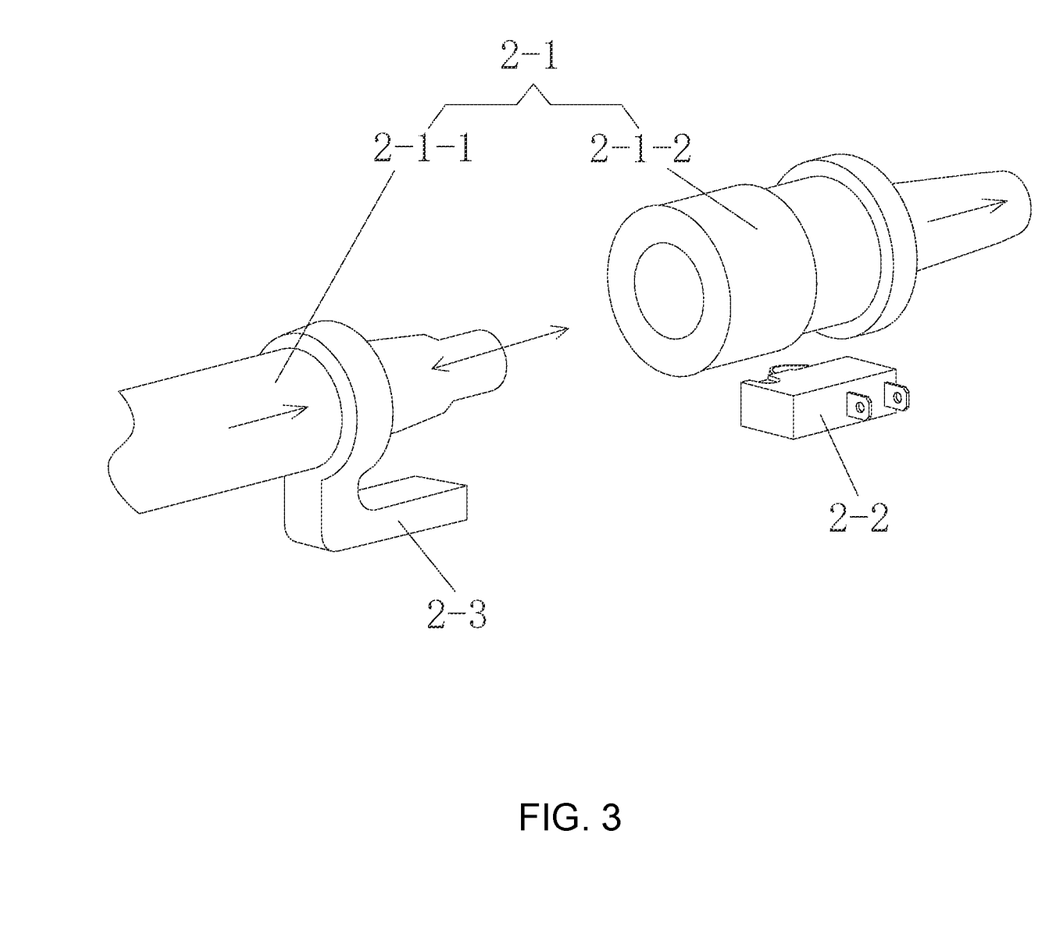
FIG. 3 is a structural diagram of a second fuel valve assembly of the invention.

In one illustrative embodiment of the invention, the first fuel is gasoline, and the second fuel is liquefied petroleum gas. Of course, those skilled in the art would appreciate that the first fuel and/or the second fuel may be other fuels such as natural gas and methane. Correspondingly, as shown in FIG. 2, the first fuel valve assembly 1 comprises a first fuel valve 1-1 disposed on the first fuel delivery pipe and a first switch 1-2 adjacent to the first fuel valve; a first trigger part 1-3 matched with the first switch 1-2 is disposed on the first fuel valve 1-1 and triggers the first switch 1-2 in the on state or in the off state; one terminal of the first switch 1-2 is connected to the first signal input terminal, and the other terminal of the first switch 1-2 is grounded or is connected to a high level (in this embodiment, the other terminal of the first switch 1-2 is grounded). Specifically, the first fuel valve 1-1 is a rotary switch structure, the first trigger part 1-3 is located on a rotary knob of the rotary switch, and the first switch 1-2 is a micro-switch located on a rotation path of the rotary knob of the rotary switch serving as the first fuel valve 1-1; in the on state or in the off state, the first trigger part 1-3 triggers the first switch 1-2, and then, a low-level (ground) signal is acquired by the first signal input terminal to serve as the signal corresponding to the on state or the off state of the first fuel valve assembly. Correspondingly, as shown in FIG. 3, the second fuel valve assembly 2 comprises a second fuel valve 2-1 disposed on the second fuel delivery pipe and a second switch 2-2 adjacent to the second fuel valve; a second trigger part 2-3 matched with the second switch 2-2 is disposed on the second fuel valve 2-1 and triggers the second switch 2-2 in the on state or in the off state; one terminal of the second switch 2-2 is connected to the second signal input terminal, and the other terminal of the second switch 2-2 is grounded or is connected to a high level (in this embodiment, the other terminal of the second switch 2-2 is grounded). Specifically, the second fuel valve 2-1 comprises a switch male terminal 2-1-1 and a switch female terminal 2-1-2 matched with the switch male terminal 2-1-1, the second switch 2-2 is a micro-switch and is adjacent to the switch female terminal 2-1-2, and the second trigger part 2-3 is disposed on the switch male terminal 2-1-1. When the switch male switch 2-1-1 is plugged into the switch female terminal 2-1-2, the second trigger part 2-3 triggers the second switch 2-2, and a low-level (ground) signal is acquired by the second signal input terminal to serve as the signal corresponding to the on state of the second fuel valve assembly. On the contrary, when the switch male terminal 2-1-1 is unplugged from the switch female terminal 2-1-2, the second trigger part 2-3 disengages from the second switch 2-2, the second switch 2-2 resets, and the second signal input terminal acquires the signal corresponding to the off state of the second fuel valve assembly. Of course, in actual application, the second switch 2-2 may be adjacent to the switch male terminal 2-1-1, and the second trigger part 2-3 is disposed on the switch female terminal 2-1-2.

As a preferred implementation of this embodiment, a switch valve 6 (an electromagnetic valve in this embodiment) is disposed on the first fuel delivery pipe and/or the second fuel delivery pipe, and a control signal input terminal of the electromagnetic valve is communicated and connected with the controller 3; the controller 3 can control the electromagnetic valve to close to prevent residual fuels in the delivery pipes from passively entering the generator engine.

The control system further comprises an indicator device 7 (an indicator light or an alarm) connected to the controller 3, and the indicator device 7 is used to indicate to a user whether or not the current operating state of the generator engine is normal.

Figure 4:
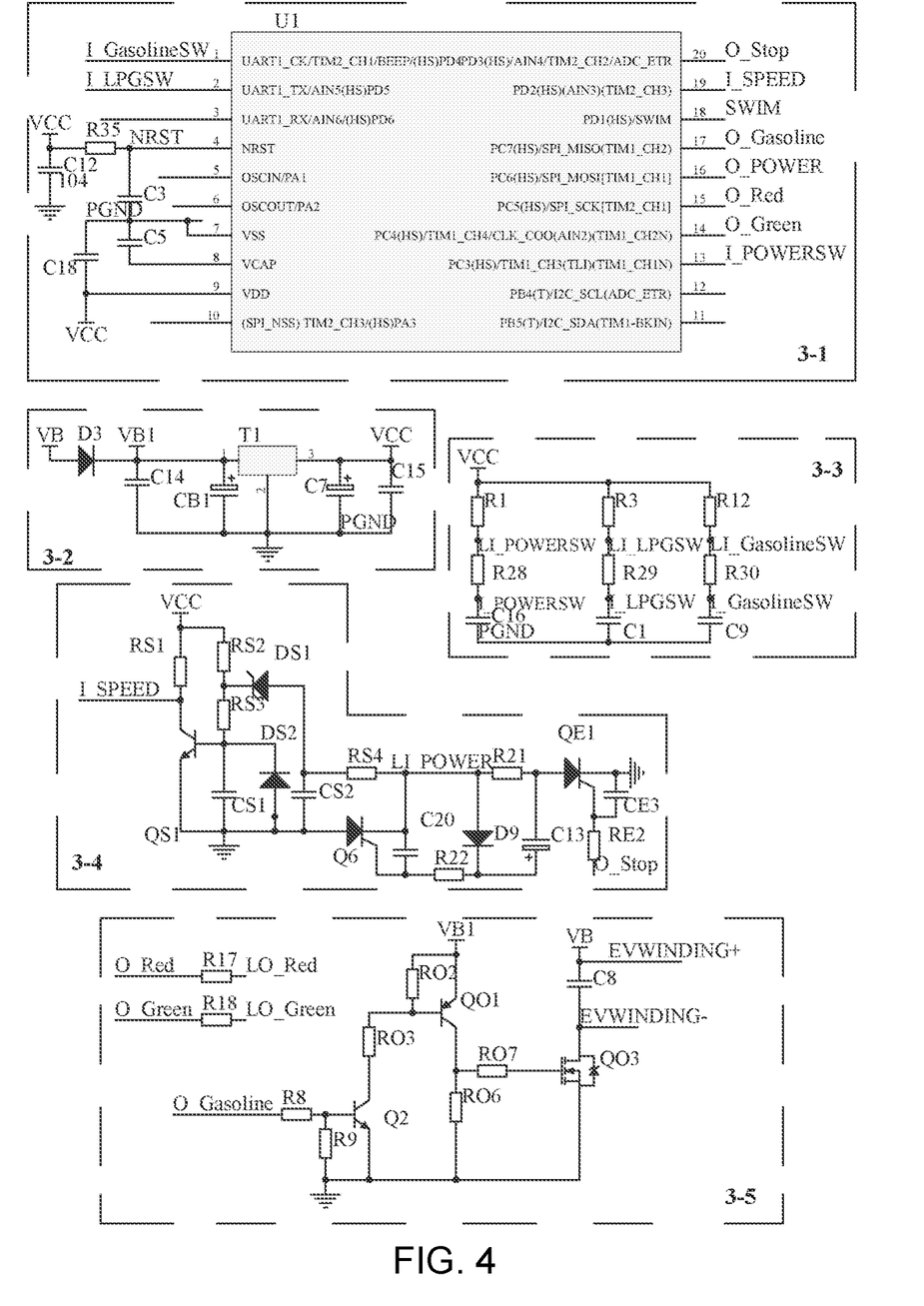
FIG. 4 is a schematic circuit diagram of a controller of the invention.

As shown in FIG. 4, the controller 3 comprises an MCU 3-1 (U1, an STM8S003 MCU is adopted in this embodiment), a voltage stabilizing circuit 3-2, a signal detection circuit 3-3, an ignition system control circuit 3-4, and an electromagnetic valve control circuit 3-5, wherein:

The voltage stabilizing circuit 3-2 has an input terminal connected to the power supply unit 4 and an output terminal outputting a stable 5V direct current to provide working power for other circuits on the MCU 3-1 and the controller 3;

The signal detection circuit 3-3 comprises a resistor R12, a resistor R30 and a capacitor C9 sequentially connected in series, a resistor R3, a resistor R29 and a capacitor C1 sequentially connected in series, and a resistor RI, a resistor R28 and a capacitor C16 sequentially connected in series, and the three series circuits are connected in parallel; a pin 1 of the MCU (U1) is connected to a contact I GasolineSW between the resistor R30 and the capacitor C9, and the first switch 1-2 is connected to a contact LI GasolineSW between the resistor R12 and the resistor R30; a pin 2 of the MCU (U1) is connected to a contact I LPGSW between the resistor R29 and the capacitor C1, and the second switch 2-2 is connected to a contact LI LPGSW between the resistor R3 and the resistor R29; a pin 13 of the MCU (U1) is connected to a contact I POWERSW between the resistor R28 and the capacitor C16, one terminal of the switch K3 is connected to a contact LI POWERSW between the resistor RI and the resistor R28, and the other terminal of the switch K3 is grounded.

The ignition system control circuit 3-4 has an input terminal O Stop connected to a pin 20 of the MCU (U1) and a contact LI POWER connected to the ignition device 5; whether or not the contact LI POWER of the ignition system control circuit is grounded is controlled by means of a signal output via the pin 20 of the MCU (U1); if the contact LI POWER is grounded, the generator engine will not be started even if the start signal is received; or, if the contact LI POWER is not grounded, the generator engine will be started when the start signal is received.

The electromagnetic valve control circuit 3-5 has an input terminal O Gasoline connected to a pin 17 of the MCU (U1) and an output signal connected to the electromagnetic valve to control on-off of the electromagnetic valve.

A pin 14 and a pin 15 of the MCU (U1) are connected to the indicator device 7 (such as an indicator light) through a resistor R8 and a resistor R17 respectively so as to control the state of the indicator device 7 (for example, the indicator light turns green or red).

Figure 5:
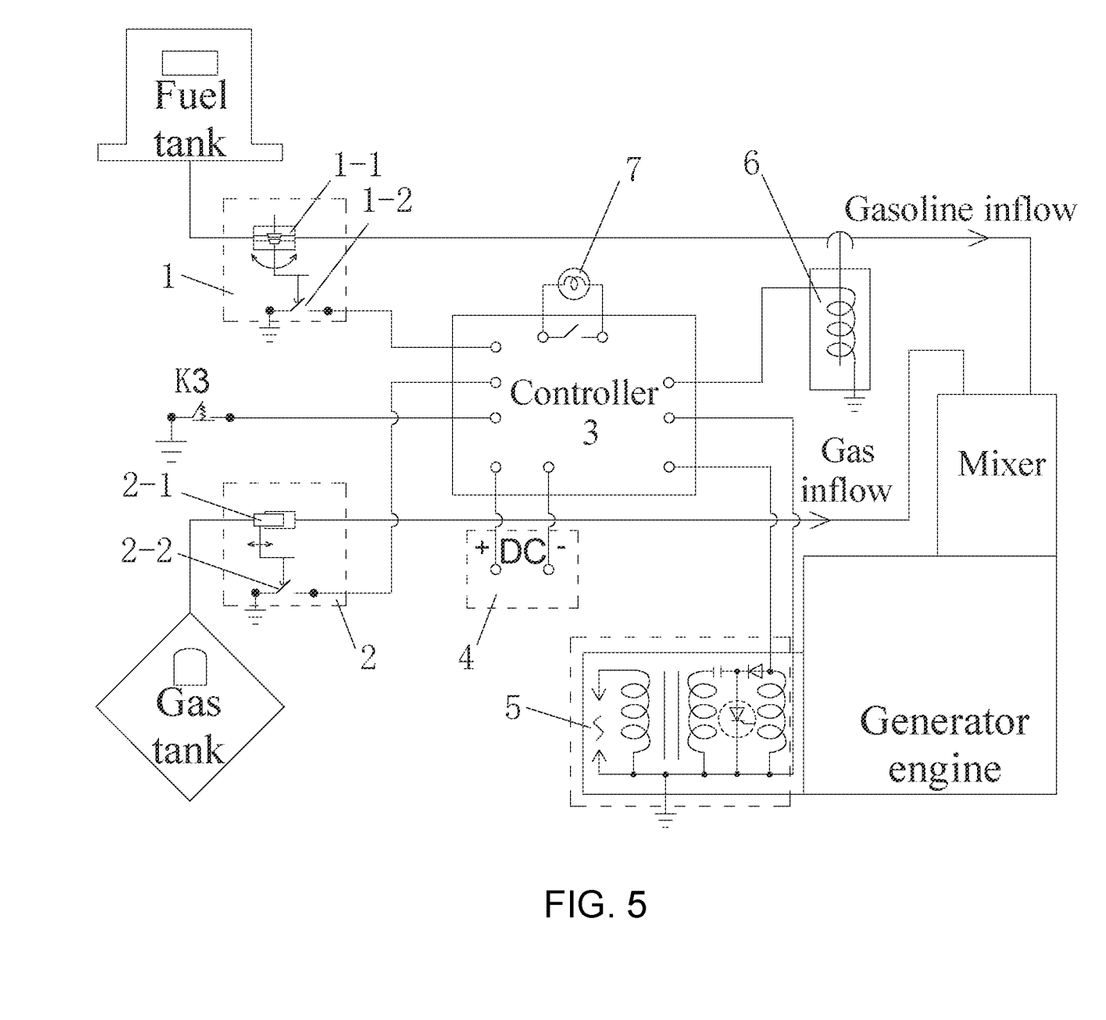
FIG. 5 is a diagram of a control system adopting CDI in Embodiment 1.

The ignition device 5 adopts TCI (Transistor Coil Ignition). Of course, those skilled in the art would appreciate that the ignition device 5 may also adopt CDI (Condenser Diode Ignition), as shown in FIG. 5.

The operating principle of this embodiment is described below:

If the first switch 1-2 is triggered to close when the first fuel valve 1-1 is in the on state and the second switch 2-2 is not triggered and is maintained in the off state when the second fuel valve 2-1 is in the off state, the first fuel delivery pipe will be turned on to allow gasoline (the first fuel) to flow from a fuel tank to a fuel-air mixer, such as a dual-fuel carburetor, along a gasoline pipe (the first fuel delivery pipe), and the second fuel delivery pipe is maintained in the off state; a generator engine start signal is sent to the controller 3 (by operating a switch K3, controlling a mobile phone APP or remotely controlling a key); when the controller 3 detects that the first signal input terminal thereof receives the signal corresponding to the on state of the first fuel valve assembly 1 and the second signal input terminal thereof receives the signal corresponding to the off state of the second fuel valve assembly 2, the controller 3 controls the ignition device 5 (such as an ignition coil or an ignition plug) to ignite normally, and the generator engine enters into a normal operating state. To realize better man-machine interface, the controller 3 can control the indicator device 7 to display a normal operating signal, for example, the indicator light turns green.

If the first switch 1-2 is not triggered and is maintained in the off state when the first fuel valve 1-1 is in the off state and the second switch 2-2 is triggered to close when the second fuel valve 2-1 is in the on state, the first fuel delivery pipe is maintained in the off state, the second fuel delivery pipe will be turned on to allow liquefied petroleum gas (the second fuel) to flow from a gas tank to the fuel-air mixer, such as the dual-fuel carburetor, along a gas pipe (the second fuel delivery pipe); a generator engine start signal is sent to the controller 3 (by operating the switch K3, controlling the mobile phone APP or remotely controlling the key); when the controller 3 detects that the first signal input terminal thereof receives the signal corresponding to the off state of the first fuel valve assembly 1 and the second signal input terminal thereof receives the signal corresponding to the on state of the second fuel valve assembly 2, the controller 3 drives the switch valve (an electromagnetic valve in this embodiment) 6 to cut off the gasoline line to prevent residual gasoline in the first fuel delivery pipe from passively entering the generator engine and controls the ignition device 5 (such as an ignition coil or an ignition plug) to ignite normally, and the generator engine is started to enter into a normal operating state. To realize better man-machine interface, the controller 3 can also control the indicator device 7 to display a normal operating signal, for example, the indicator light turns green. Of course, in case where fuel lines controlled by the first fuel valve assembly 1 and/or the second fuel valve assembly 2 are short, it is unnecessary to install the switch valve 6 and to actively cut off the fuel supply.

Before the generator engine is started, if both the first fuel valve 1-1 and the second fuel valve 2-1 are in the on state due to misoperation and both the first switch 1-2 and the second switch 2-2 are triggered to close, that is, both fuels can be supplied, a generator engine start signal is sent to the controller 3 (by operating the switch K3, controlling the mobile phone APP or remotely controlling the key); when the controller 3 detects that the first signal input terminal thereof receives the signal corresponding to the on state of the first fuel valve assembly 1 and the second signal input terminal thereof receives the signal corresponding to the on state of the second fuel valve assembly 2, the controller 3 controls the indicator device 7 to display an abnormal operating signal, for example, the indicator light turns red to remind an operator to cut off the generator engine start signal (for example, to turn off the switch K3) in time and to check the current state of the first fuel valve 1-1 and the second fuel valve 2-1. If the generator engine is started due to the fact that the operator fails to cut off the generator engine start signal (for example, to turn off the switch K3) in time, the controller 3 controls the ignition device 5 to flame out the engine automatically within a set short time (such as 0-3 seconds) after the generator engine is started. To realize better man-machine interface, the controller 3 can control the indicator device 7 to give an abnormal operating alarm, for example, the indicator light turns red and flickers.

Under the condition where both fuels can be supplied, the following solutions may be adopted: A, a generator engine start signal is sent to the controller 3 (by operating the switch K3, controlling the mobile phone APP or remotely controlling the key); when the controller 3 detects that the first signal input terminal thereof receives the signal corresponding to the on state of the first fuel valve assembly 1 and the second signal input terminal thereof receives the signal corresponding to the on state of the second fuel valve assembly 2, the controller 3 controls the ignition device 5 not to ignite. To realize better man-machine interface, the controller 3 can control the indicator device 7 to display an abnormal operating signal, for example, the indicator light turns red to remind the operator to cut off the generator engine start signal (for example, to turn off the switch K3) in time and to check the current state of the first fuel valve 1-1 and the second fuel valve 2-1. B, a generator engine start signal is sent to the controller 3 (by operating the switch K3, controlling the mobile phone APP or remotely controlling the key), and the controller 3 controls the ignition device 5 to ignite to start the generator engine; when the controller 3 detects that the first signal input terminal thereof receives the signal corresponding to the on state of the first fuel valve assembly 1 and the second signal input terminal thereof receives the signal corresponding to the on state of the second fuel valve assembly 2, the controller 3 controls the ignition device 5 to flame out the engine automatically within a set short time (such as 0-3 seconds) after the generator engine is started. To realize better man-machine interface, the controller 3 can control the indicator device 7 to give an abnormal operating alarm, for example, the indicator light turns red and flickers to remind the operator to cut off the generator engine start signal (for example, to turn off the switch K3) in time and to check the current state of the first fuel valve 1-1 and the second fuel valve 2-1.

Before the generator engine is started, if both the first fuel valve 1-1 and the second fuel valve 2-1 are in the off state due to misoperation and both the first switch 1-2 and the second switch 2-2 are not triggered and are maintained in the off state, that is, neither of the two fuels can be supplied, a generator engine start signal is sent to the controller 3 (by operating the switch K3, controlling the mobile phone APP or remotely controlling the key); when the controller 3 detects that the first signal input terminal thereof receives the signal corresponding to the off state of the first fuel valve assembly 1 and the second signal input terminal thereof receives the signal corresponding to the off state of the second fuel valve assembly 2, the controller 3 controls the indicator device 7 to display an abnormal operating signal, for example, the indicator light remains off to remind the operator to cut off the generator engine start signal (for example, to turn off the switch K3) in time and to check the current state of the first fuel valve 1-1 and the second fuel valve 2-1. If the generator engine is driven by the ignition device 5 (such as an ignition coil or an ignition plug) to start due to the existence of few fuels, that can enable the generator engine to operate, in the fuel supply system (the first fuel delivery pipe and the second fuel delivery pipe), the controller 3 controls the ignition device 5 to flame out the engine automatically within a set short time (such as 0-3 seconds) after the generator engine is started. To realize better man-machine interface, the controller 3 can control the indicator device 7 to give an abnormal operating alarm, for example, the indicator light turns red and flickers.

Under the condition where neither of the two fuels can be supplied, the following solutions may be adopted: A, a generator engine start signal is sent to the controller 3 (by operating the switch K3, controlling the mobile phone APP or remotely controlling the key); when the controller 3 detects that the first signal input terminal thereof receives the signal corresponding to the off state of the first fuel valve assembly 1 and the second signal input terminal thereof receives the signal corresponding to the off state of the second fuel valve assembly 2, the controller 3 controls the ignition device 5 not to ignite. To realize better man-machine interface, the controller 3 can control the indicator device 7 to display an abnormal operating signal, for example, the indicator light remains off to remind the operator to cut off the generator engine start signal (for example, to turn off the switch K3) in time and to check the current state of the first fuel valve 1-1 and the second fuel valve 2-1. B, a generator engine start signal is sent to the controller 3 (by operating the switch K3, controlling the mobile phone APP or remotely controlling the key), and the controller 3 controls the ignition device 5 to ignite; if the generator engine is stared due to the existence of few fuels, that can enable the generator engine to operate, in the fuel supply system, when the controller 3 detects that the first signal input terminal thereof receives the signal corresponding to the off state of the first fuel valve assembly 1 and the second input terminal thereof receives the signal corresponding to the off state of the second fuel valve assembly 2, the controller 3 controls the ignition device 5 to flame out the engine automatically within a set short time (such as 0-3 seconds) after the generator engine is started. To realize better man-machine interface, the controller 3 can control the indicator device 7 to give an abnormal operating alarm, for example, the indicator light turns red and flickers to remind the operator to cut off the generator engine signal (for example, to turn off the switch K3) in time and to check the current state of the first fuel valve 1-1 and the second fuel valve 2-1. Abnormal states of the two fuels can be intelligently determined to actively shut down or stop the generator engine, and users can be intelligently reminded to correctly control the engine.

Those skilled in the art would appreciate that three or more fuel valve assemblies may be configured and connected to the controller 3 to realize control over a multi-fuel generator engine.

According to one embodiment of the invention, a control method for a dual-fuel generator engine comprises:

A first fuel valve assembly 1 is provided, wherein the first fuel valve assembly 1 has an on state and an off state and is used to control the supply of a first fuel, and the specific structure of the first fuel valve assembly 1 is as described above and will no longer be detailed herein;

A second fuel valve assembly 2 is provided, wherein the second fuel valve assembly 2 has an on state and an off state and is used to control the supply of a second fuel, and the specific structure of the second fuel valve assembly 2 is as described above and will no longer be detailed herein;

A controller 3 is provided, wherein the controller 3 has a first signal input terminal connected to the first fuel valve assembly 1 to acquire a signal corresponding to a current state of the first fuel valve assembly, a second signal input terminal connected to the second fuel valve assembly 2 to acquire a signal corresponding to a current state of the second fuel valve assembly, a third signal input terminal for receiving a generator engine start and/or stop signal, and an output terminal connected to an ignition device 5 of a generator engine;

A power supply unit 4 for supplying power to the controller 3 is provided, wherein the power supply unit 4 is an internal battery or an external accumulator, and in this embodiment, the power supply unit 4 is an external accumulator for supplying power to the controller 3, that is, the controller 3 is in an electrical state and can work normally before the generator engine is started;

When the third signal input terminal of the controller 3 receives the generator engine start signal and the controller 3 detects that either the first signal input terminal or the second input terminal receives a signal corresponding to the on state of the corresponding valve assembly, the controller 3 controls the ignition device 5 to ignite. That is, when the third signal input terminal of the controller 3 receives the generator engine start signal (through a remote key, a mobile phone APP or an external switch; in this embodiment, an external switch K3 is directly connected to the third signal input terminal, and the other terminal of the switch is grounded), the first signal input terminal receives a signal corresponding to the on state of the first fuel valve assembly 1 and the second signal input terminal receives a signal corresponding to the off state of the second fuel valve assembly 2, the controller 3 controls the ignition device 5 to ignite; or, when the third signal input terminal of the controller 3 receives the generator engine start signal, the first signal input terminal receives the signal corresponding to the off state of the first fuel valve assembly 1 and the second signal input terminal receives a signal corresponding to the on state of the second fuel valve assembly 2, the controller 3 controls the ignition device 5 to ignite.

As a preferred implementation of this embodiment, a switch valve 6 (an electromagnetic valve in this embodiment) is disposed on the first fuel delivery pipe and/or the second fuel delivery pipe, and a control signal input terminal of the electromagnetic valve is in communicated and connected with the controller 3; the controller 3 can control the electromagnetic valve to close to prevent residual fuels in the delivery pipes from passively entering the generator engine.

The control system further comprises an indicator device 7 (such as an indicator light or an alarm) connected to the controller 3, and the indicator device 7 is used to indicate to a user whether or not the current operating state of the generator engine is normal.

The ignition device 5 adopts TCI (Transistor Coil Ignition). Those skilled in the art would appreciate that the ignition device 5 may also adopt CDI (Condenser Diode Ignition), as shown in FIG. 5.

In actual application of the method in this embodiment, the control logic under different circumferences can be understood with reference to the operating principle of the control system mentioned above, and will no longer be detailed herein.

Those skilled in the art would appreciate that three or more fuel valve assemblies may be configured and connected to the controller 3 to realize control over a multi-fuel generator engine.

Embodiment 2

Figure 6:
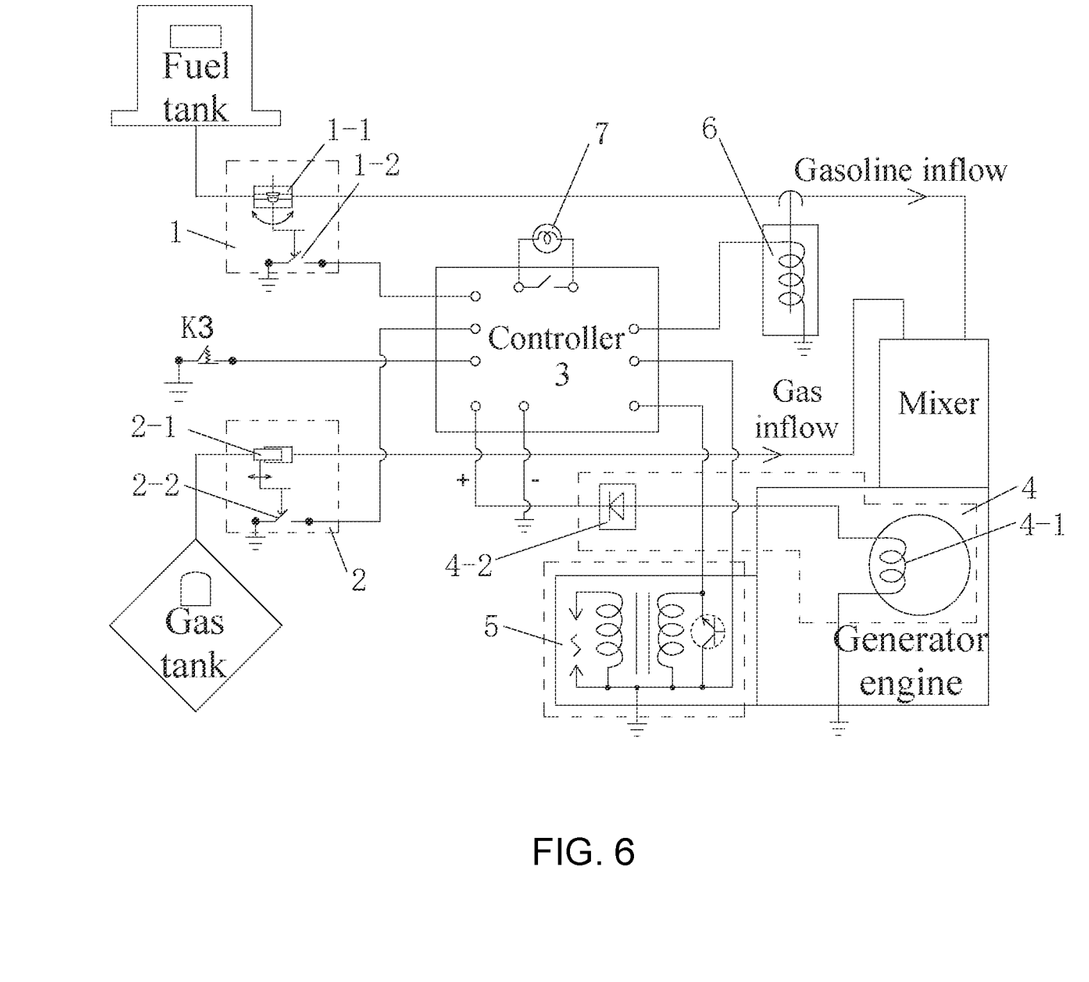
FIG. 6 is a structural diagram of Embodiment 2 (TCI).

As shown in FIG. 6, this embodiment is basically identical with Embodiment 1 and differs from Embodiment 1 in that a power supply unit 4 acquires power, after a generator engine is started, from the generator engine or a generator and supplies the power to a controller 3.

Specifically, a control system for a dual-fuel generator engine comprises:

A first fuel valve assembly 1 which has an on state and an off state and is disposed on a first fuel delivery pipe to control the supply of a first fuel, wherein the first fuel valve assembly 1 in this embodiment is identical in specific structure with the first fuel valve assembly 1 in Embodiment 1 and will no longer be detailed herein;

A second fuel valve assembly 2 which has an on state and an off state and is disposed on a second fuel delivery pipe to control the supply of a second fuel, wherein the second fuel valve assembly 2 in this embodiment is identical in specific structure with the second fuel valve assembly 2 in Embodiment 1 and will no longer be detailed herein;

A controller 3 which has a first signal input terminal connected to the first fuel valve assembly 1 to acquire a signal corresponding to a current state of the first fuel valve assembly 1, a second signal input terminal connected to the second fuel valve assembly 2 to acquire a signal corresponding to a current state of the second fuel valve assembly 2, and an output terminal connected to an ignition device 5 of a generator engine;

A power supply unit 4 which acquires power, after the generator engine is started, from the generator engine or a generator and supplies the power to the controller 3;

When either the first signal input terminal or the second signal input terminal of the controller 3 receives a signal corresponding to the on state of the corresponding valve assembly, the current operating state will be maintained. That is, after the generator engine is started (a recoil starter is started in this embodiment), if the first signal input terminal of the controller 3 receives a signal corresponding to the on state of the first fuel valve assembly 1 and the second signal input terminal of the controller 3 receives a signal corresponding to the off state of the second fuel valve assembly 2, the current normal operating state of the generator engine will be maintained; or, if the first signal input terminal of the controller 3 receives a signal corresponding to the off state of the first fuel valve assembly 1 and the second signal input terminal of the controller 3 receives a signal corresponding to the on state of the second fuel valve assembly 2, the current normal operating state of the generator engine will be maintained.

As a preferred implementation of this embodiment, if the first signal input terminal and the second signal input terminal of the controller 3 receive the signals corresponding to the on state of the valve assemblies at the same time, the controller 3 controls the ignition device 5 to flame out the engine; or, if the first signal input terminal and the second input terminal of the controller 3 receive the signals corresponding to the off state of the valve assemblies at the same time, the controller 3 controls the ignition device 5 to flame out the engine.

As a preferred implementation of this embodiment, the power supply unit 4 comprises:

A coil 4-1 which is coupled to the generator or the engine and may be a generator winding, a charging coil of the engine, or the like, wherein if the coil 4-1 is the generator winding, alternating currents will be generated when the generator operates (driven by the generator engine); if the coil 4-1 is the charging coil of the engine, alternating currents will be generated when the generator engine operates; and A rectification circuit 4-2 which has an input terminal connected to the coil 4-1 and an output terminal connected to the controller 3 and is used to rectify the alternating currents generated by the coil 4-1 into direct currents to be supplied to the controller 3, wherein in this embodiment, the rectification circuit is a rectifier, and 5V or 12V direct currents will be output after rectification.

As a preferred implementation of this embodiment, a switch valve 6 (an electromagnetic valve in this embodiment) is disposed on the first fuel delivery pipe and/or the second fuel delivery pipe, and a control signal input terminal of the electromagnetic valve is communicated and connected with the controller 3; the controller 3 can control the electromagnetic valve to close to prevent residual fuels in the delivery pipes from passively entering the generator engine.

The controller 3 further has a third signal input terminal for receiving a generator engine stop signal. In this embodiment, the third signal input terminal is grounded through a switch K3.

The control system further comprises an indicator device 7 (such as an indicator light or an alarm) connected to the controller 3, and the indicator device 7 is used to indicate to a user whether or not the current operating state of the generator engine is normal.

Figure 7:
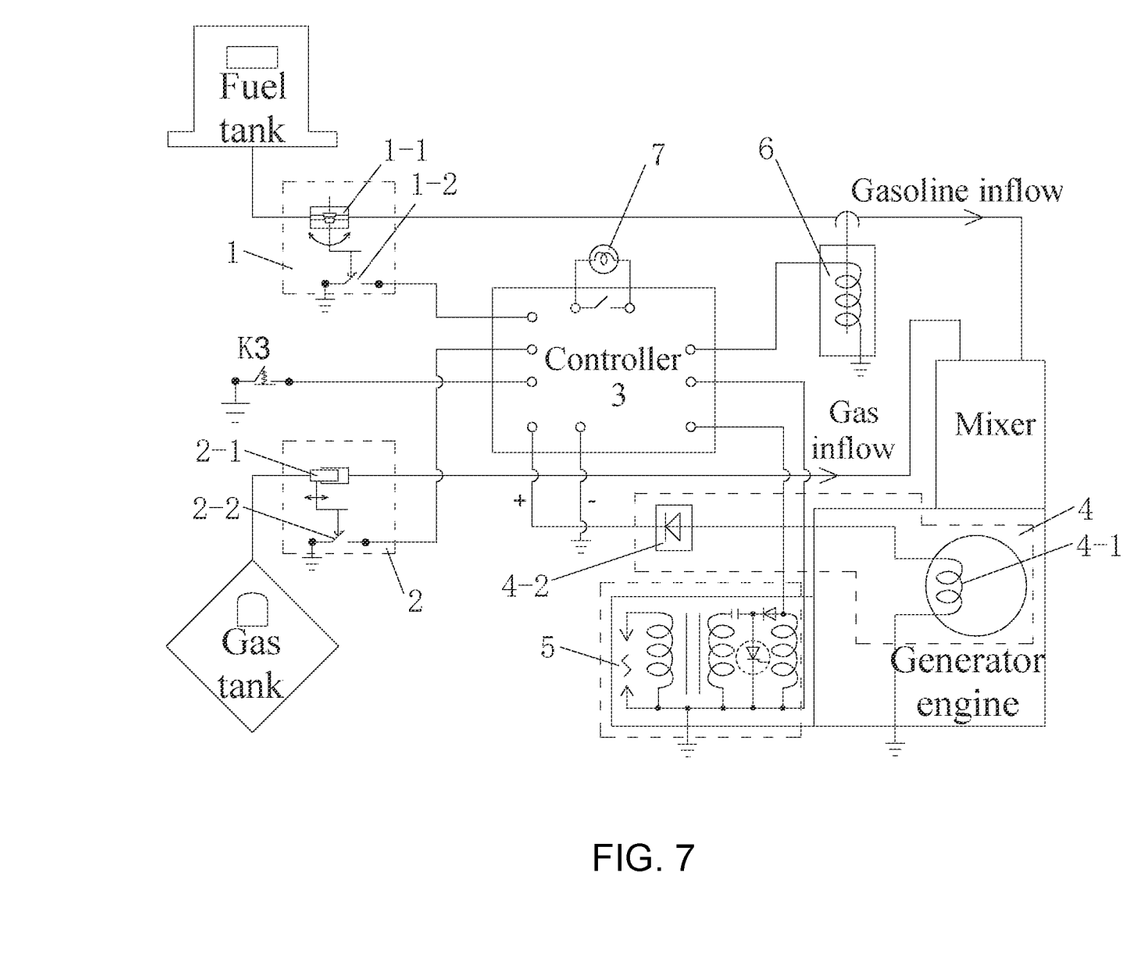
FIG. 7 is a diagram of a control system adopting CDI in Embodiment 2.

The ignition device 5 adopts TC (Transistor Coil Ignition). Those skilled in the art would appreciate that the ignition device 5 may also adopt CDI (Condenser Diode Ignition), as shown in FIG. 7.

The operating principle of this embodiment is explained below:

If the first switch 1-2 is triggered to close when the first fuel valve 1-1 is in the on state and the second switch 2-2 is not triggered and is maintained in the off state when the second fuel valve 2-1 is in the off state, the first fuel delivery pipe will be turned on to allow gasoline (the first fuel) to flow from a fuel tank to a fuel-air mixer, such as a dual-fuel carburetor, along a gasoline pipe (the first fuel delivery pipe), and the second fuel delivery pipe is kept off. The generator engine is started by means of a recoil starter (or in other ways, for example, by means of a reverse starter), and the coil 4-1 (such as a charging coil of the engine, or a generator winding) generates alternating currents which are rectified by the rectification circuit 4-2 into 5V or 12V direct currents to be supplied to the controller 3; after the controller 3 is powered on, if the controller 3 detects that the first signal input terminal thereof receives the signal corresponding to the on state of the first fuel valve assembly 1 and the second signal input terminal thereof receives the signal corresponding to the off state of the second fuel valve assembly 2, the generator engine is maintained in the current startup state and enters into a normal operating state. To realize better man-machine interface, the controller 3 can control the indicator device 7 to display a normal operating signal, for example, the indicator light turns green.

If the first switch 1-2 is not triggered and is maintained in the off state when the first fuel valve 1-1 is in the off state and the second switch 2-2 is triggered to close when the second fuel valve 2-1 is in the on state, the first fuel delivery pipe is kept off, and the second fuel delivery pipe will be turned on to allow liquefied petroleum gas (the second fuel) to flow from a gas tank to the fuel-air mixer, such as a dual-fuel carburetor, along a gas pipe (the second fuel delivery pipe). The generator engine is started by means of a recoil starter (or in other ways, such as by means of a reverse starter), and the coil 4-1 (such as a charging coil of the engine, or a generator winding) generates alternating currents which are rectified by the rectification circuit 4-2 into 5V or 12V direct currents to be supplied to the controller 3; after the controller 3 is powered on, if the controller 3 detects that the first signal input terminal thereof receives the signal corresponding to the off state of the first fuel valve assembly 1 and the second signal input terminal thereof receives the signal corresponding to the on state of the second fuel valve assembly 2, the controller 3 controls the switch valve 6 (an electromagnetic valve in this embodiment) to cut off the gasoline line to prevent residual gasoline in the first fuel delivery pipe from passively entering the generator engine, and the generator engine is maintained in the current startup state and enters into a normal operating state. To realize better man-machine interface, the controller 3 can control the indicator device 7 to display a normal operating signal, for example, the indicator light turns green. Of course, in case where fuel lines controlled by the first fuel valve assembly 1 and/or the second fuel valve assembly 2 are short, it is unnecessary to install the switch valve 6 and to actively cut off the fuel supply.

Before the generator engine is started, if both the first fuel valve 1-1 and the second fuel valve 2-1 are in the on state due to misoperation and both the first switch 1-2 and the second switch 2-2 are triggered to close, that is, both fuels can be supplied, the generator engine is started by means of a recoil starter (or in other ways, for example, by means of a reverse starter), and the coil 4-1 (such as a charging coil of the engine, or a generator winding) generates alternating currents which are rectified by the rectification circuit 4-2 into 5V or 12V direct currents to be supplied to the controller 3; after the controller 3 is powered on, if it is detected detects that the first signal input terminal of the controller 3 receives the signal corresponding to the on state of the first fuel valve assembly 1 and the second signal input terminal of the controller 3 receives the signal corresponding to the on state of the second fuel valve assembly 2, the indicator device 7 will be controlled to display an abnormal operating signal, for example, the indicator light turns red to remind an operator to trigger the generator engine stop (flame-out) signal (for example, to turn off the switch K3) in time and to check the current state of the first fuel valve 1-1 and the second fuel valve 2-1. If the operator fails to trigger the generator engine stop (flame-out) signal (for example, to turn off the switch K3) in time, the controller 3 controls the ignition device 5 to flame out the engine automatically within a set short time (such as 0-3 seconds) after receiving the signals corresponding to the on state. To realize better man-machine interface, the controller 3 can control the indicator device 7 to give an abnormal operating alarm, for example, the indicator light turns red and flickers.

Under the condition where both fuels can be supplied, the following solution may be adopted: after the controller 3 is powered on, if it is detected that the first signal input terminal of the controller 3 receives the signal corresponding to the on state of the first fuel valve assembly 1 and the second signal input terminal of the controller 3 receives the signal corresponding to the on state of the second fuel valve assembly 2, the controller 3 controls the ignition device 5 to flame out the engine automatically with a set short time (such as 0-3 seconds) after receiving the signals corresponding to the on state. To realize better man-machine interface, the controller 3 can control the indicator device 7 to give an abnormal operating alarm, for example, the indicator light turns red and flickers to remind the operator to trigger the generator engine stop (flame-out) signal (for example, to turn off the switch K3) in time and to check the current state of the first fuel valve 1-1 and the second fuel valve 2-1.

Before the generator engine is started, if both the first fuel valve 1-1 and the second fuel valve 2-1 are in the off state due to misoperation and the first switch 1-2 and the second switch 2-2 are triggered and are in the off state, that is, neither of the two fuels can be supplied, the generator engine is started by means of a recoil starter (or in other ways, for example, by means of a reverse starter), and in most cases, the generator engine will not be started; if the generator engine is started due to the existence of few fuels, that can enable the generator engine to operate, in the fuel supply system (the first fuel delivery pipe and the second fuel delivery pipe), the coil 4-1 (such as a charging coil of the engine, or a generator winding) will generate alternating currents which are rectified by the rectification circuit 4-2 into 5V or 12V direct currents supplied to the controller 3; after the controller 3 is powered on, if it is detected that the first signal input terminal of the controller 3 receives the signal corresponding to the off state of the first fuel valve assembly 1 and the second signal input terminal of the controller 3 receives the signal corresponding to the off state of the second fuel valve assembly 2, the controller 3 controls the ignition device 5 to flame out the engine automatically within a set short time (such as 0-3 seconds) after receiving the signals corresponding to the off state. To realize better man-machine interface, the controller 3 can control the indicator device 7 to give an abnormal operating alarm, for example, the indicator light turns red and flickers to remind the operator to trigger the generator engine stop (flame-out) signal (for example, to turn off the switch K3) in time and to check the current state of the first fuel valve 1-1 and the second fuel valve 2-1.

Under the condition where neither of the two fuels can be supplied, the following solution may be adopted: after the controller 3 is powered on, if it is detected that the first signal input terminal of the controller 3 receives the signal corresponding to the off state of the first fuel valve assembly 1 and the second signal input terminal of the controller 3 receives the signal corresponding to the off state of the second fuel valve assembly 2, the indicator device 7 will be controlled to display an abnormal operating signal, for example, the indicator light turns red to remind the operator to trigger the generator engine stop (flame-out) signal (for example, to turn off the switch K3) in time and to check the current state of the first fuel valve 1-1 and the second fuel valve 2-1. If the operator fails to trigger the generator engine stop (flame-out) signal (for example, to turn off the switch K3) in time, the controller 3 controls the ignition device 5 to flame out the engine automatically within a set short time (such as 0-3 seconds) after receiving the signals corresponding to the off state. To realize better man-machine interface, the controller 3 can control the indicator device 7 to give an abnormal operating alarm, for example, the indicator light turns red and flickers. Abnormal states of the two fuels can be intelligently determined to actively shut down or stop the generator engine, and users can be intelligently reminded to correctly control the engine.

Those skilled in the art would appreciate that three or more fuel valve assemblies may be configured and connected to the controller 3 to realize control over a multi-fuel generator engine.

According to one embodiment of the invention, a control method for a dual-fuel generator engine comprises:

A first fuel valve assembly 1 is provided, wherein the first fuel valve assembly 1 has an on state and an off state and is used to control the supply of a first fuel, and the first fuel valve assembly 1 in this embodiment is identical in specific structure with the first fuel valve assembly 1 in Embodiment 1 and will no longer be detailed herein;

A second fuel valve assembly 2 is provided, wherein the second fuel valve assembly has an on state and an off state and is used to control the supply of a second fuel, and the second fuel valve assembly 2 in this embodiment is identical in specific structure with the second fuel valve assembly in Embodiment 1 and will no longer be detailed herein;

A controller 3 is provided, wherein the controller 3 has a first signal input terminal connected to the first fuel valve assembly 1 to acquire a signal corresponding to a current state of the first fuel valve assembly, a second signal input terminal connected to the second fuel valve assembly 2 to acquire a signal corresponding to a current state of the second fuel valve assembly, and an output terminal connected to an ignition device 5 of a generator engine;

A power supply unit 4 is provided, wherein the power supply unit 4 acquires power, after the generator engine is started, from the generator engine or a generator and supplies the power to the controller 3;

When either the first signal input terminal or the second signal input terminal of the controller 3 receives a signal corresponding to the on state of the corresponding valve assembly, the current operating state is maintained. That is, after the generator engine is started (by means of a recoil starter in this embodiment), if the first signal input terminal of the controller 3 receives a signal corresponding to the on state of the first fuel valve assembly 1 and the second signal input terminal of the controller 3 receives a signal corresponding to the off state of the second fuel valve assembly 2, the current normal operating state of the generator engine will be maintained; or, if the first signal input terminal of the controller 3 receives a signal corresponding to the off state of the first fuel valve assembly 1 and the second signal input terminal of the controller 3 receives a signal corresponding to the on state of the second fuel valve assembly 2, the current normal operating state of the generator engine will be maintained.

As a preferred implementation of this embodiment, if the first signal input terminal and the second signal input terminal of the controller 3 receive the signals corresponding to the on state of the valve assemblies at the same time, the controller 3 controls the ignition device 5 to flame out the engine; or, if the first signal input terminal and the second signal input terminal of the controller 3 receive the signals corresponding to the off state of the valve assemblies, the controller 3 controls the ignition device 5 to flame out the engine.

As a preferred implementation of this embodiment, the power supply unit 4 comprises:

A coil 4-1 coupled to the generator or the engine, wherein the coil 4-1 is a generator winding, a charging coil of the engine, or the like; if the coil 4-1 is the generator winding, alternating currents will be generated when the generator operates (driven by the generator engine); if the coil 4-1 is the charging coil of the engine, alternating currents will be generated when the generator engine operates; and A rectification circuit 4-2 which has an input terminal connected to the coil 4-1 and an output terminal connected to the controller 3 and is used to rectify the alternating currents generated by the coil 4-1 into direct currents to be supplied to the controller 3, wherein in this embodiment, the rectification circuit is a rectifier, and 5V or 12V direct currents will be output after rectification.

In a preferred implementation of this embodiment, a switch valve 6 (an electromagnetic valve in this embodiment) is disposed on the first fuel delivery pipe and/or the second fuel delivery pipe and is communicated and connected with the controller 3; the controller 3 can control the electromagnetic valve to close to prevent residual fuels in the fuel delivery pipes from passively entering the generator engine.

The controller 3 further has a third signal input terminal for receiving a generator engine stop signal. In this embodiment, the third signal input terminal is grounded through a switch K3.

The control system further comprises an indicator device 7 (such as an indicator light or an alarm) connected to the controller 3, and the indicator device 7 is used to indicate to a user whether or not the current operating state of the generator engine is normal.

The ignition device 5 adopts TCI (Transistor Coil Ignition). Those skilled in the art would appreciate that the ignition device 5 may also adopt CDI (Condenser Diode Ignition), as shown in FIG. 7.

In actual application of the method in this embodiment, the logic control under different circumferences can be understood with reference to the operating principle of the control system in this embodiment and will no longer be detailed herein.

Those skilled in the art would appreciate that three or more fuel valve assemblies may be configured and connected to the controller 3 to realize control over a multi-fuel generator engine.

What is claimed is:

1. A control system for a multi-fuel generator engine, comprising:
a first fuel valve assembly which has an on state and an off state and is disposed on a first fuel delivery pipe to control the supply of a first fuel;
a second fuel valve assembly which has an on state and an off state and is disposed on a second fuel delivery pipe to control the supply of a second fuel;
a controller which has a first signal input terminal connected to the first fuel valve assembly to acquire a signal corresponding to a current state of the first fuel valve assembly, a second signal input terminal connected to the second fuel valve assembly to acquire a signal corresponding to a current state of the second fuel valve assembly, a third signal input terminal for receiving a generator engine start and/or stop signal, and an output terminal connected to an ignition device of a generator engine; and
a power supply unit for supplying power to the controller, wherein:
when the third signal input terminal of the controller receives the generator engine start signal and either the first signal input terminal or the second signal input terminal receives a signal corresponding to the on state of the corresponding valve assembly, the controller controls the ignition device to ignite, and
the first fuel valve assembly comprises a first fuel valve disposed on the first fuel delivery pipe and a first switch adjacent to the first fuel valve, a first trigger part matched with the first switch is disposed on the first fuel valve and triggers the first switch in the on state or in the off state, and the first switch has a terminal connected to the first signal input terminal and a terminal grounded or connected to a high level.

2. The control system for a multi-fuel generator engine according to claim 1, wherein the second fuel valve assembly comprises a second fuel valve disposed on the second fuel delivery pipe and a second switch adjacent to the second fuel valve, a second trigger part matched with the second switch is disposed on the second fuel valve and triggers the second switch in the on state or in the off state, and the second switch has a terminal connected to the second signal input terminal and a terminal grounded or connected to a high level.

3. The control system for a multi-fuel generator engine according to claim 1, wherein a switch valve is disposed on the first fuel delivery pipe and/or the second fuel delivery pipe, and a control signal input terminal of the switch valve is communicated and connected with the controller; the control system further comprises an indicator device connected to the controller.

4. A control method for a multi-fuel generator engine, comprising:
providing a first fuel valve assembly which has an on state and an off state and is used to control the supply of a first fuel;
providing a second fuel valve assembly which has an on state and an off state and is used to control the supply of a second fuel;
providing a controller which has a first signal input terminal connected to the first fuel valve assembly to acquire a signal corresponding to a current state of the first fuel valve assembly, a second signal input terminal connected to the second fuel valve assembly to acquire a signal corresponding to a current state of the second fuel valve assembly, a third signal input terminal for receiving a generator engine start and/or stop signal, and an output terminal connected to an ignition device of a generator engine; and providing a power supply unit for supplying power to the controller, wherein:

when the third signal input terminal of the controller receives the generator engine start signal and either the first signal input terminal or the second signal input terminal receives a signal corresponding to the on state of the corresponding valve assembly, the controller controls the ignition device to ignite, the first fuel valve assembly comprises a first fuel valve disposed on a first fuel delivery pipe and a first switch adjacent to the first fuel valve, a first trigger part matched with the first switch is disposed on the first fuel valve and triggers the first switch in the on state or in the off state, and the first switch has a terminal connected to the first signal input terminal and a terminal grounded or connected to a high level, and the second fuel valve assembly comprises a second fuel valve disposed on a second fuel delivery pipe and a second switch adjacent to the second fuel valve, a second trigger part matched with the second switch is disposed on the second fuel valve and triggers the second switch in the on state or in the off state, and the second switch has a terminal connected to the second signal input terminal and a terminal grounded or connected to a high level.

5. The control method for a multi-fuel generator engine according to claim 4, wherein a switch valve is disposed on the first fuel delivery pipe and/or the second fuel delivery pipe, and a control signal input terminal of the switch valve is communicated and connected with the controller; a control system further comprises an indicator device connected to the controller.

6. A control system for a multi-fuel generator engine, comprising:

a first fuel valve assembly which has an on state and an off state and is disposed on a first fuel delivery pipe to control the supply of a first fuel;

a second fuel valve assembly which has an on state and an off state and is disposed on a second fuel delivery pipe to control the supply of a second fuel;

a controller which has a first signal input terminal connected to the first fuel valve assembly to acquire a signal corresponding to a current state of the first fuel valve assembly, a second signal input terminal connected to the second fuel valve assembly to acquire a signal corresponding to a current state of the second fuel valve assembly, and an output terminal connected to an ignition device of a generator engine; and a power supply unit which acquires power, after the generator engine is started, from the generator engine or a generator and supplies the power to the controller;

when either the first signal input terminal or the second signal input terminal of the controller receives a signal corresponding to the on state of the corresponding valve assembly, a current operating state of the generator engine is maintained, when the first signal input terminal and the second signal input terminal of the controller receive the signals corresponding to the on state of the valve assembles at a same period of time, the controller controls the ignition device to flame out the engine; or when the first signal input terminal and the second signal input terminal of the controller receive signals corresponding to the off state of the valve assemblies in a same period of time, the controller controls the ignition device to flame out the engine.

7. The control system for a multi-fuel generator engine according to claim 6, wherein the first fuel valve assembly comprises a first fuel valve disposed on the first fuel delivery pipe and a first switch adjacent to the first fuel valve, a first trigger part matched with the first switch is disposed on the first fuel valve and triggers the first switch in the on state or in the off state, and the first switch has a terminal connected to the first signal input terminal and a terminal grounded or connected to a high level;

the second fuel valve assembly comprises a second fuel valve disposed on the second fuel delivery pipe and a second switch adjacent to the second fuel valve, a second trigger part matched with the second switch is disposed on the second fuel valve and triggers the second switch in the on state or in the off state, and the second switch has a terminal connected to the second signal input terminal and a terminal grounded or connected to a high level.

8. The control system for a multi-fuel generator engine according to claim 6, wherein the power supply unit comprises:

a coil for generating alternating currents when the generator engine operates; and a rectification circuit which has an input terminal connected to the coil and an output terminal connected to the controller and is used to rectify the alternating currents generated by the coil into direct currents to be supplied to the controller.

9. The control system for a multi-fuel generator engine according to claim 6, wherein a switch valve is disposed on the first fuel delivery pipe and/or the second fuel delivery pipe, and a control signal input terminal of the switch valve is communicated and connected with the controller; the control system further comprises an indicator device connected to the controller; the controller further has a third signal input terminal for receiving a generator engine stop signal.

10. A control method for a multi-fuel generator engine, comprising:

providing a first fuel valve assembly which has an on state and an off state and is used to control the supply of a first fuel;

providing a second fuel valve assembly which has an on state and an off state and is used to control the supply of a second fuel;

providing a controller which has a first signal input terminal connected to the first fuel valve assembly to acquire a signal corresponding to a current state of the first fuel valve assembly, a second signal input terminal connected to the second fuel valve assembly to acquire a signal corresponding to a current state of the second fuel valve assembly, and an output terminal connected to an ignition device of a generator engine;

providing a power supply unit which acquires power, after the generator engine is started, from the generator engine or a generator and supplies the power to the controller, wherein:

when either the first signal input terminal or the second signal input terminal of the controller receives a signal corresponding to the on state of the corresponding valve assembly, a current operating state of the generator engine is maintained, when the first signal input terminal and the second signal input terminal of the controller receive signals corresponding to the on state of the valve assembles in a same period of time, the controller controls the ignition device to flame out the engine; or when the first signal input terminal and the second signal input terminal of the controller receive signals corresponding to the off state of the valve assemblies in a same period of time, the controller controls the ignition device to flame out the engine.

11. The control method for a multi-fuel generator engine according to claim 10, wherein the first fuel valve assembly comprises a first fuel valve disposed on a first fuel delivery pipe and a first switch adjacent to the first fuel valve, a first trigger part matched with the first switch is disposed on the first fuel valve and triggers the first switch in the on state or in the off state, and the first switch has a terminal connected to the first signal input terminal and a terminal grounded or connected to a high level;

the second fuel valve assembly comprises a second fuel valve disposed on a second fuel delivery pipe and a second switch adjacent to the second fuel valve, a second trigger part matched with the second switch is disposed on the second fuel valve and triggers the second switch in the on state or in the off state, and the second switch has a terminal connected to the second signal input terminal and a terminal grounded or connected to a high level.

12. The control method for a multi-fuel generator engine according to claim 10, wherein the power supply unit comprises:

a coil for generating alternating currents when the generator engine operates; and a rectification circuit which has an input terminal connected to the coil and an output terminal connected to the controller and is used to rectify the alternating currents generated by the coil into direct currents to be supplied to the controller.

13. The control method for a multi-fuel generator engine according to claim 10, wherein a switch valve is disposed on the first fuel delivery pipe and/or the second fuel delivery pipe, and a control signal input terminal of the switch valve is communicated and connected with the controller; a control system further comprises an indicator device connected to the controller; the controller further has a third signal input terminal for receiving a generator engine stop signal.

* * * * *